United States Patent [19]
DiFrank et al.

[11] Patent Number: 5,810,900
[45] Date of Patent: Sep. 22, 1998

[54] METHOD AND APPARATUS FOR DELIVERING A CASED GLASS STREAM

[75] Inventors: Frank J. DiFrank; Garrett L. Scott, both of Toledo, Ohio

[73] Assignee: Owens-Brockway Glass Container Inc., Toledo, Ohio

[21] Appl. No.: 671,894

[22] Filed: Jun. 28, 1996

Related U.S. Application Data

[63] Continuation-in-part of Ser. No. 374,371, Jan. 18, 1995, abandoned, and Ser. No. 374,372, Jan. 18, 1995, abandoned.

[51] Int. Cl.$^6$ ........................................... C03B 7/00
[52] U.S. Cl. ............................. 65/121; 65/126; 65/145; 65/325; 65/405
[58] Field of Search ............................. 65/145, 146, 121, 65/122, 123, 126, 127, 129, 324, 325, 328, 330, 331, 405, 430, 443, 444, 529

[56] References Cited

U.S. PATENT DOCUMENTS

| | | | |
|---|---|---|---|
| 1,529,948 | 3/1925 | Freese | 65/145 |
| 1,622,666 | 3/1927 | Peiler . | |
| 1,828,217 | 10/1931 | Barker, Jr. . | |
| 1,946,879 | 2/1934 | Peltier | 65/121 |
| 2,052,269 | 8/1936 | Woods | 65/145 |
| 2,500,105 | 3/1950 | Weber | 65/121 |
| 3,015,842 | 1/1962 | Stalego . | |
| 3,078,695 | 2/1963 | Kozak et al. | 65/183 |
| 3,288,583 | 11/1966 | Sheldon . | |
| 3,291,584 | 12/1966 | Sheldon . | |
| 3,508,904 | 4/1970 | Keefer . | |
| 3,554,726 | 1/1971 | Daly . | |
| 3,580,713 | 5/1971 | Schirm et al. . | |
| 3,582,299 | 6/1971 | Gladwell, Jr. | 65/12 |
| 3,607,184 | 9/1971 | Williams . | |
| 3,622,289 | 11/1971 | Hansen et al. | 65/1 |
| 3,625,671 | 12/1971 | Schirm et al. . | |
| 3,899,315 | 8/1975 | Siegmund . | |
| 3,960,530 | 6/1976 | Iyengar . | |
| 4,023,953 | 5/1977 | Megles, Jr. et al. . | |
| 4,133,664 | 1/1979 | Aulich et al. . | |
| 4,217,123 | 8/1980 | Titchmarsh . | |
| 4,247,320 | 1/1981 | Bansal . | |
| 4,299,609 | 11/1981 | Aulich et al. . | |
| 4,305,747 | 12/1981 | Kirkman et al. . | |
| 4,340,160 | 7/1982 | van Geel et al. . | |
| 4,381,932 | 5/1983 | Olson et al. . | |
| 4,457,771 | 7/1984 | Ambrogi . | |
| 4,466,818 | 8/1984 | Brongersma . | |
| 4,740,401 | 4/1988 | Barkhau et al. | 65/145 |
| 4,875,917 | 10/1989 | Lentz . | |
| 4,897,100 | 1/1990 | Nice . | |
| 5,204,120 | 4/1993 | Hirschberger . | |

FOREIGN PATENT DOCUMENTS

| | | |
|---|---|---|
| 0722907 A2 | 7/1996 | European Pat. Off. . |
| 0722908 A2 | 7/1996 | European Pat. Off. . |
| 250394 | 8/1967 | Russian Federation . |

*Primary Examiner*—Steven P. Griffin

[57] ABSTRACT

A glass delivery system including a first forehearth having an orifice, a second forehearth having an orifice, a bottom pan assembly adapted to be positioned underneath the orifice of the first forehearth, and a glass delivery tube having an upper end adapted to be positioned underneath the orifice of the second forehearth and a lower end adapted to deliver glass to the bottom pan assembly. The orifice is adapted to combine the glass from the two forehearths and, deliver cased glass to provide an interior glass from said first forehearth and an external layer of glass from said second forehearth. Provision is made for moving the glass delivery tube horizontally, vertically and in azimuth relative to the second forehearth and for moving the bottom assembly relative to the first forehearth. The glass delivery system includes a first carriage system that supports the delivery tube assembly for movement horizontal, vertical and azimuth directions and a second carriage system on which the bottom pan assembly is mounted with respect to the first forehearth formoving the bottom pan assembly for horizontal movement relative to the first forehearth.

29 Claims, 16 Drawing Sheets

FIG. 2A

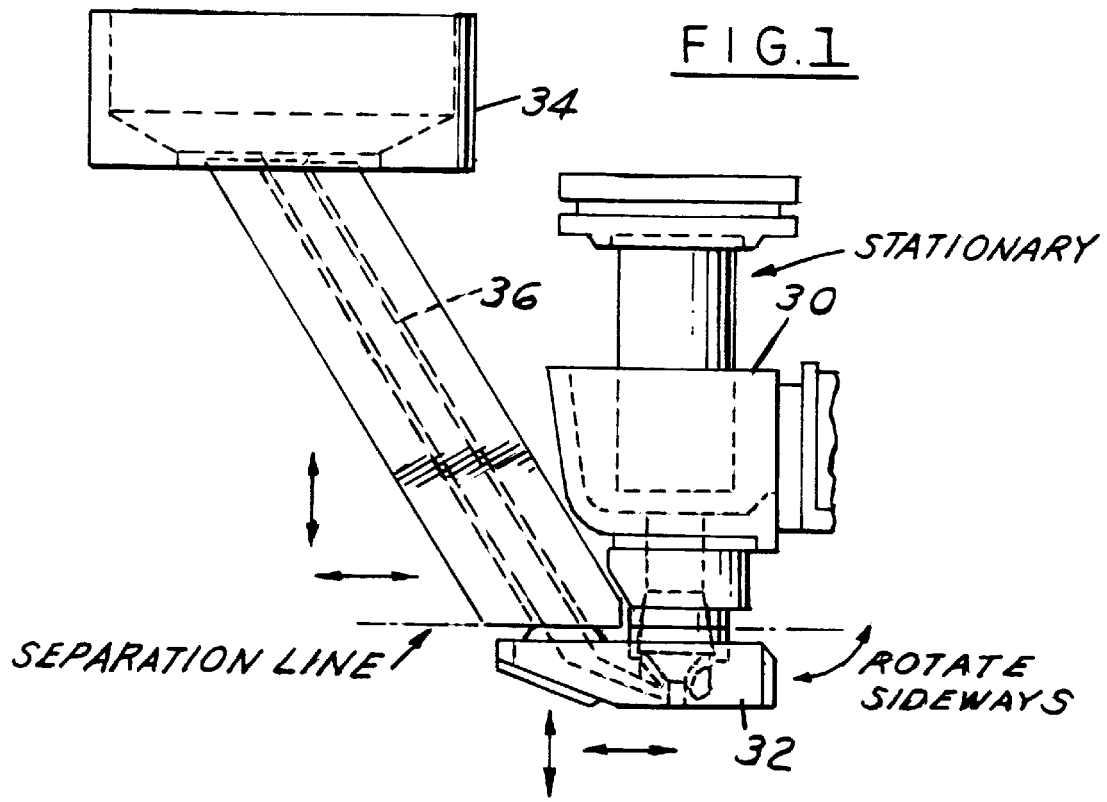
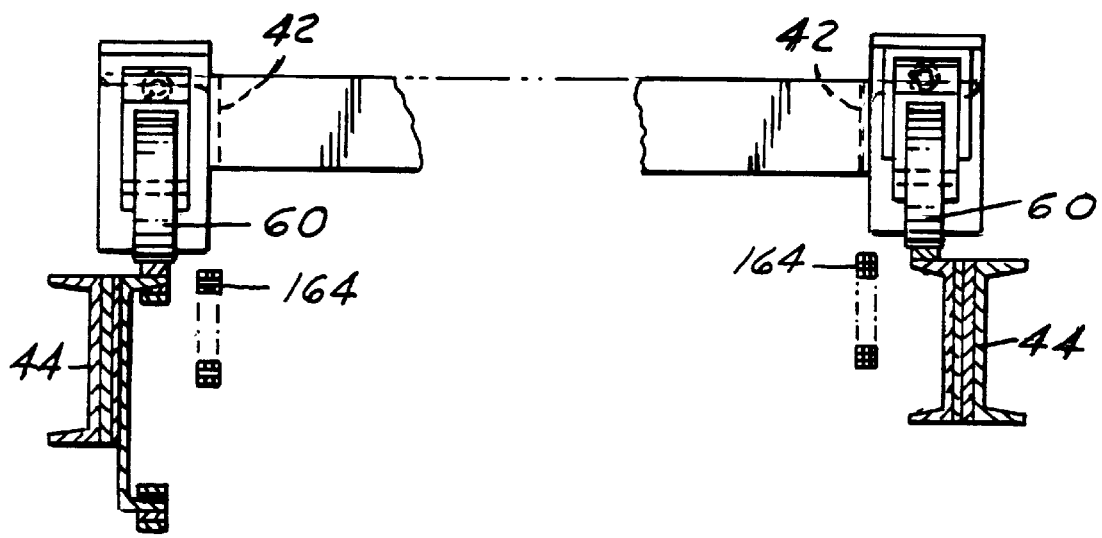

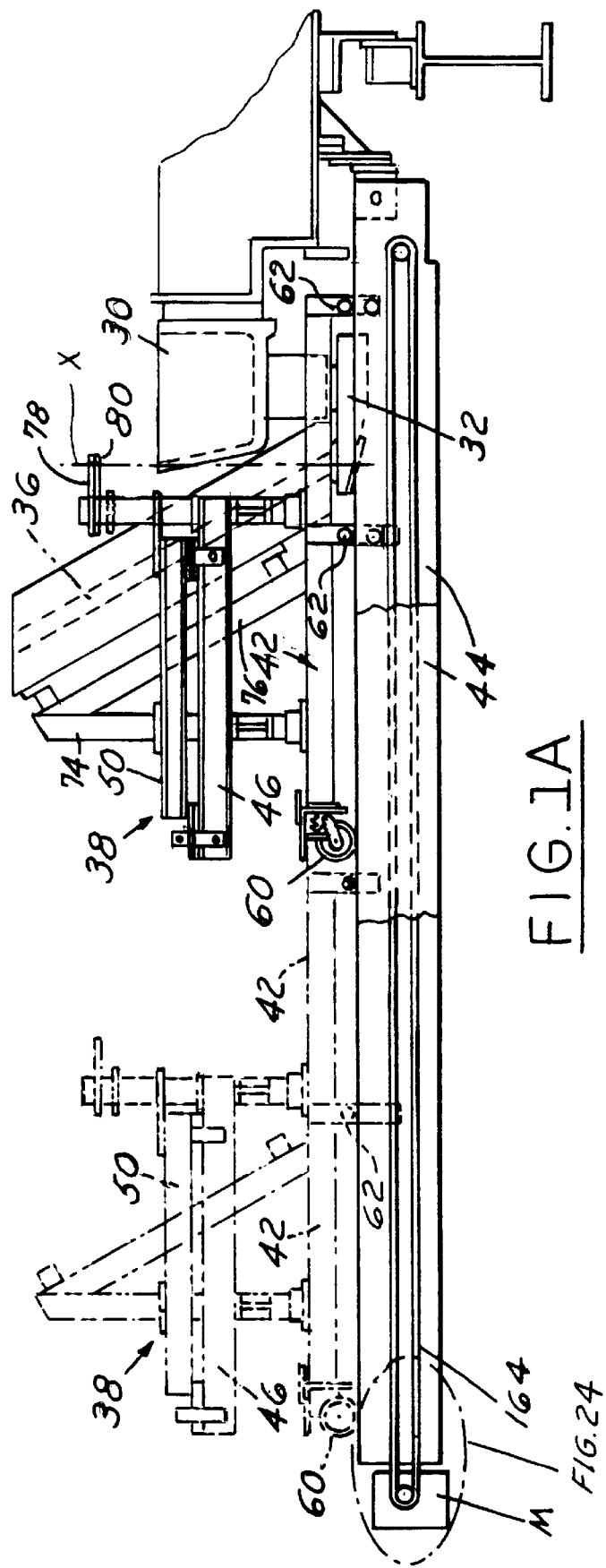

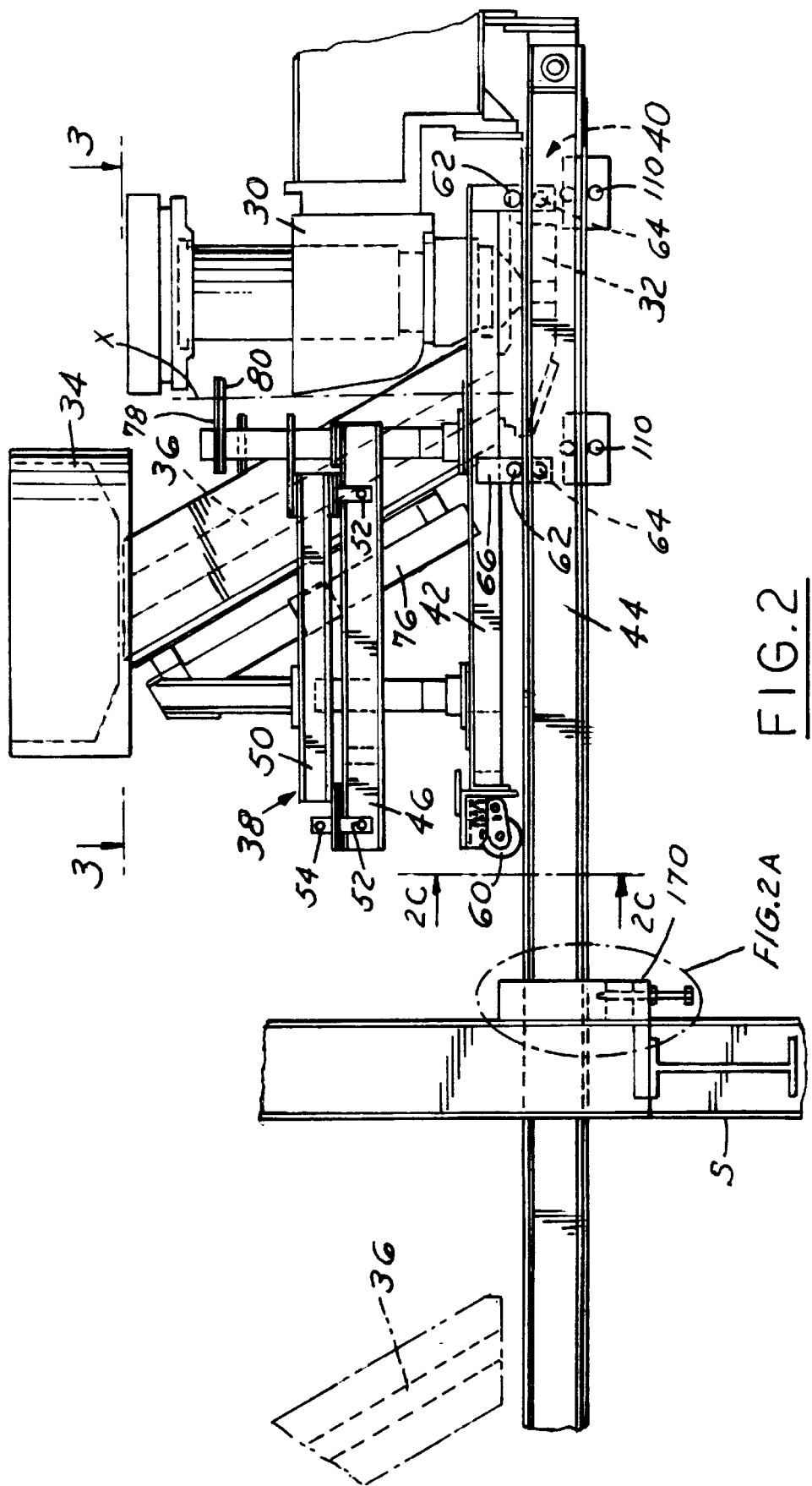

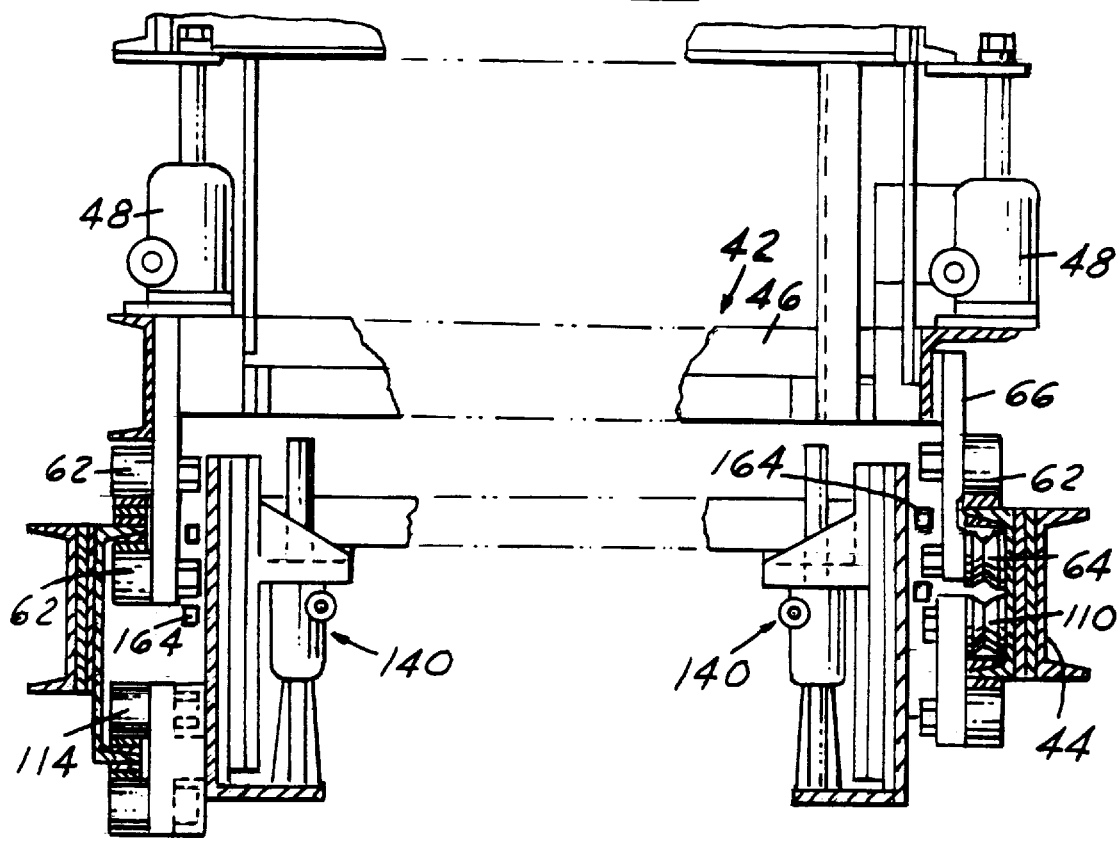
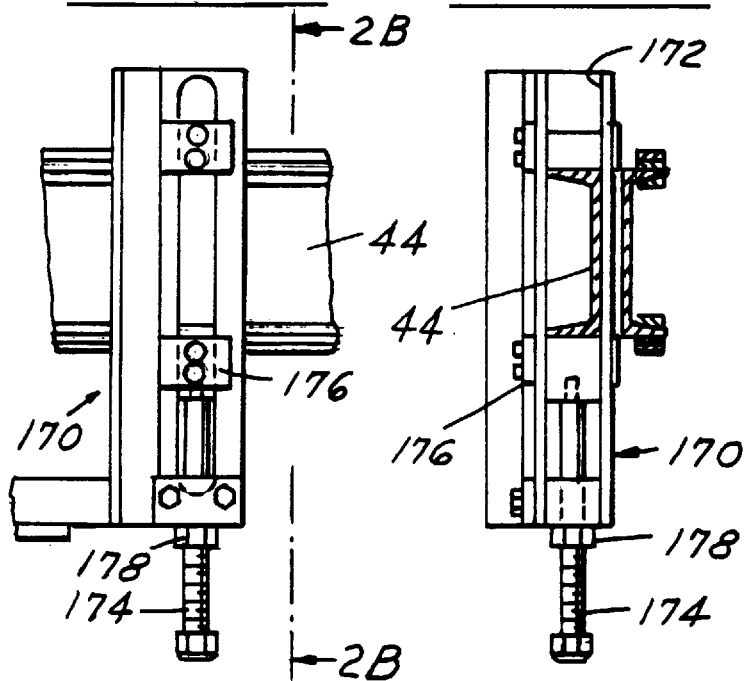

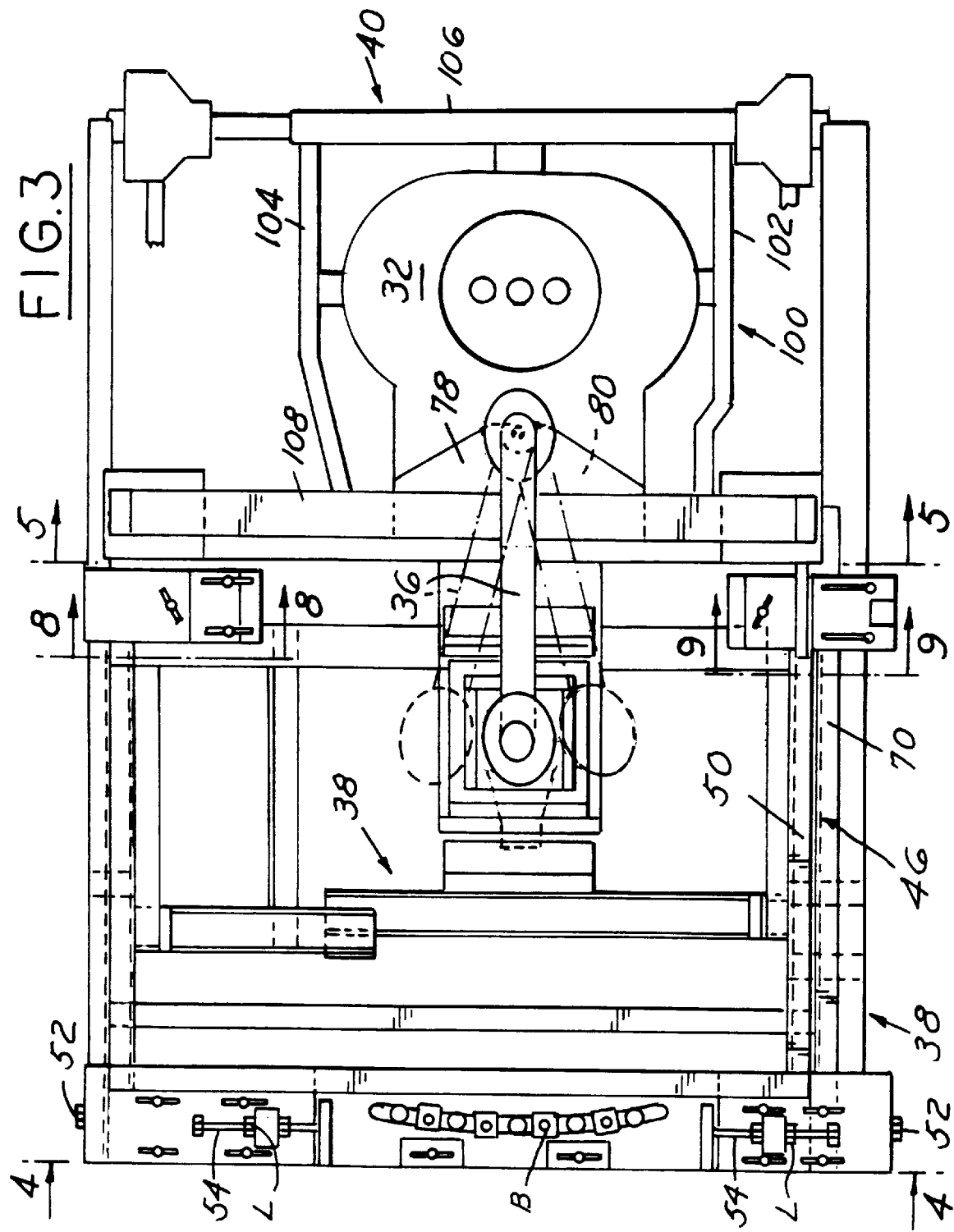

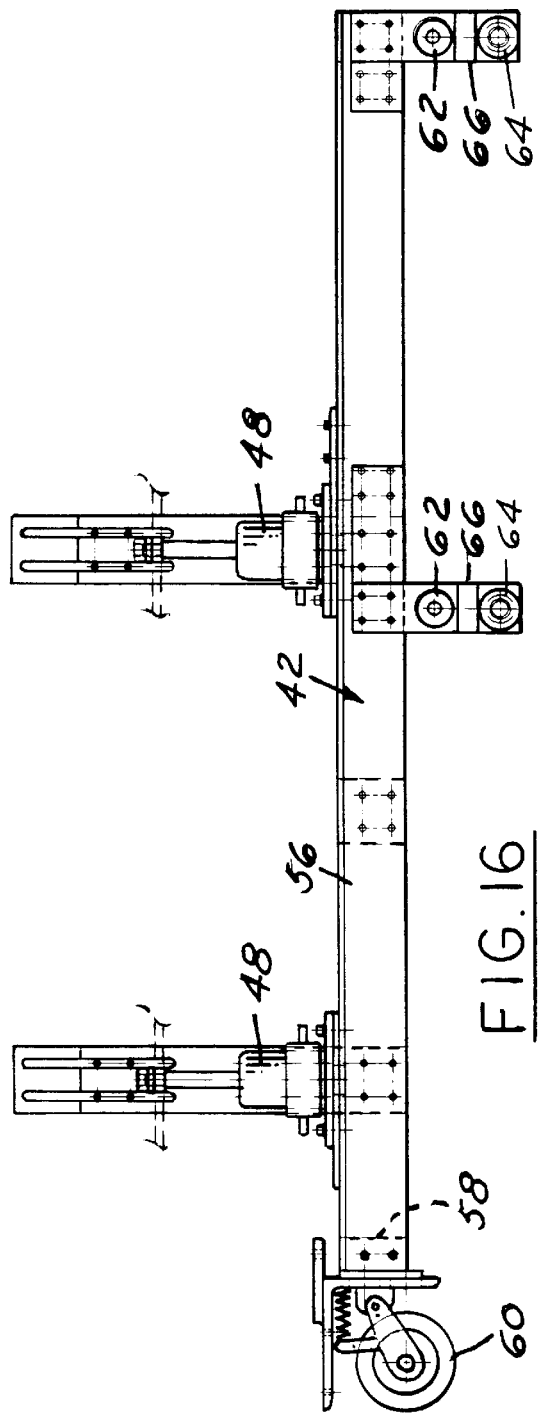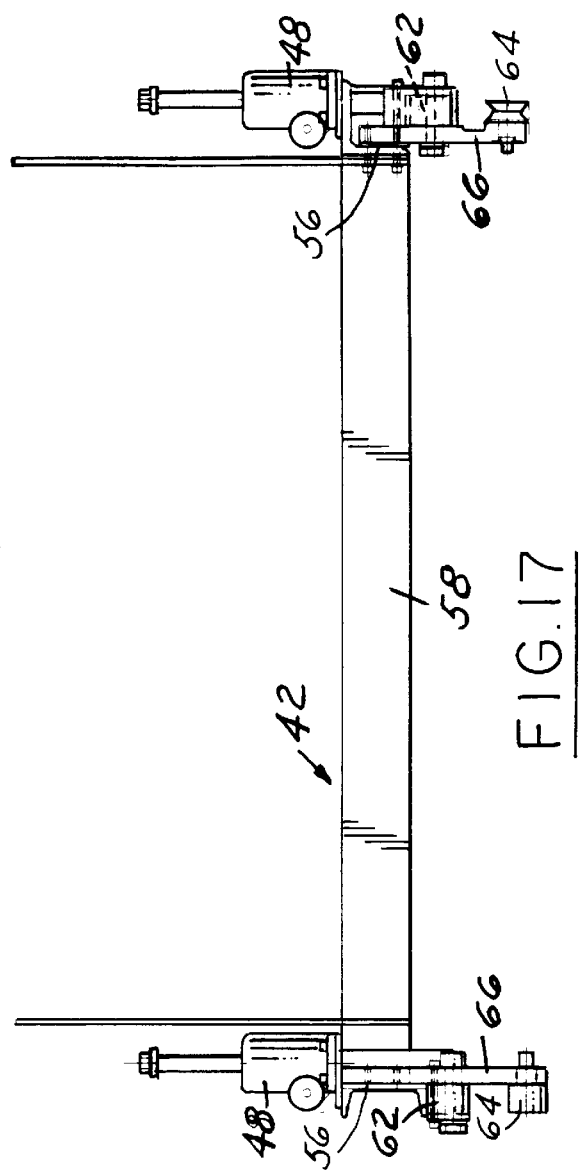

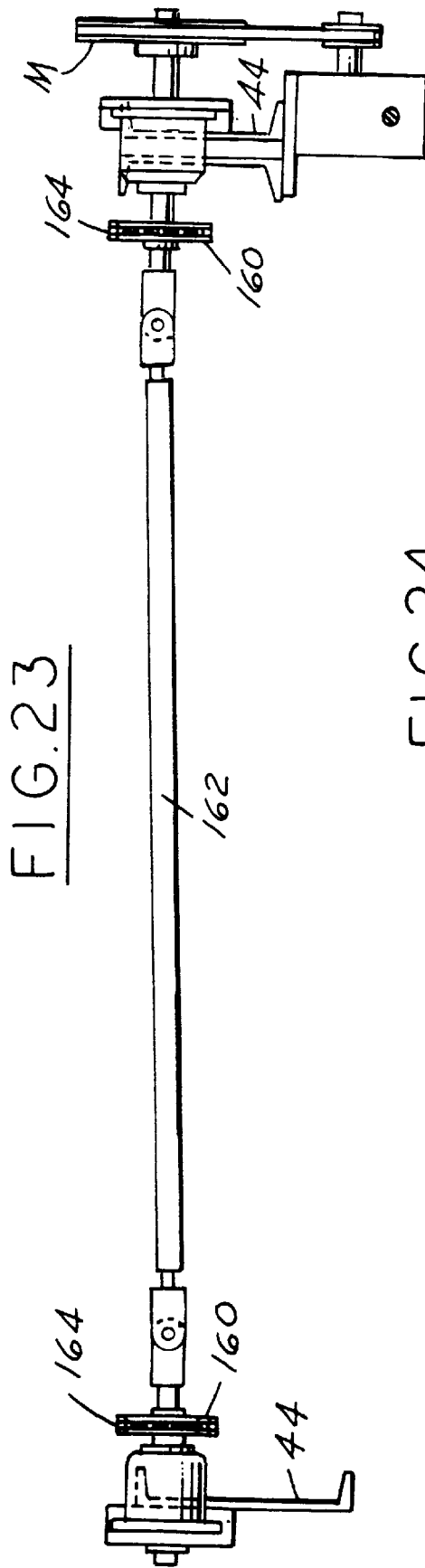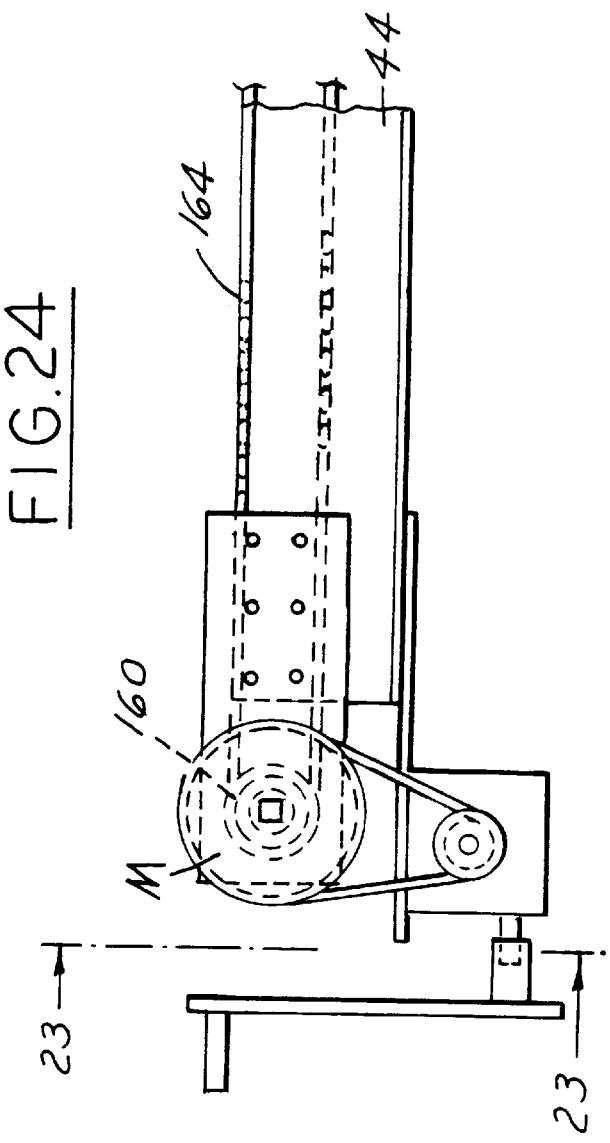

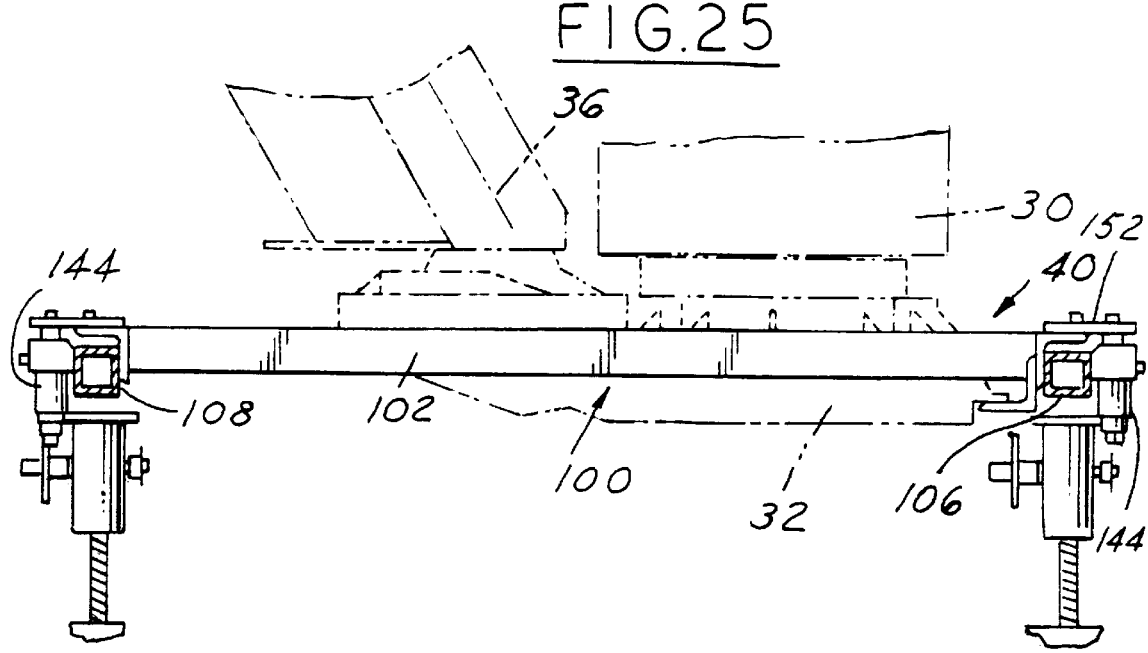
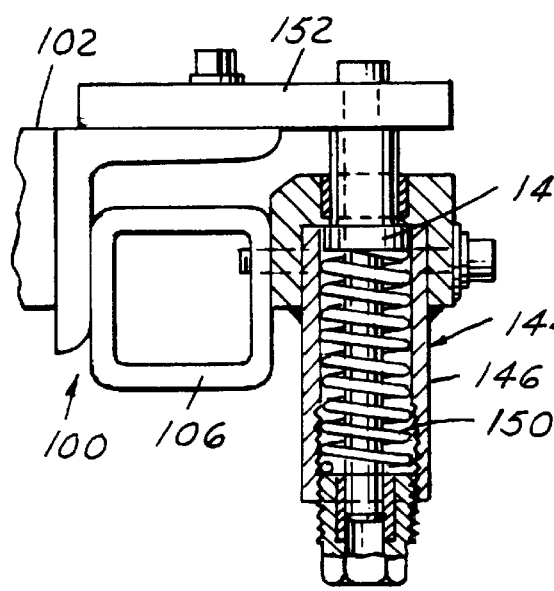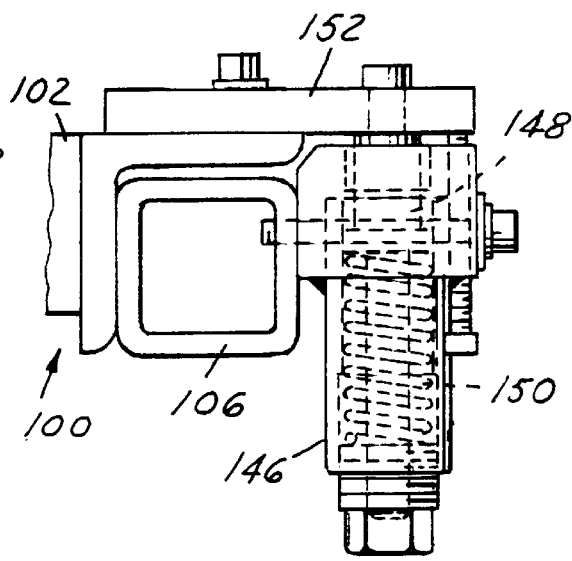

METHOD AND APPARATUS FOR DELIVERING A CASED GLASS STREAM

This application is a continuation-in-part of applications Ser. No. 08/374,371 filed Jan. 18, 1995, now abandoned in favor of Ser. No. 08/787,061 filed Jan. 18, 1997, and Ser. No. 08/374,372 filed Jan. 18, 1995, now abandoned in favor of Ser. No. 08/782,552 filed Jan. 10, 1997 incorporated herein by reference.

This invention relates to forming and delivering charges of glass which have an inner body of one type of glass and an external layer of another type of glass. Such charges as commonly known as cased gobs.

BACKGROUND AND SUMMARY OF THE INVENTION

In the forming and delivery of glass charges which have an inner layer of one type of glass and an external layer of another type of glass, commonly known as cased gobs, it is known to deliver the glass from separate forehearths to a feeder which combines the two types of glass to form the charge that is then delivered in a continuous length which is cut up to form the charges. The apparatus associated with such a delivery system is bulky and the apparatus is subject to expansion on heating and wear in use. As a result, utilization of standard construction subjects the apparatus to uncontrolled cracks and leaks in the ceramics associated with the apparatus and therefore the apparatus has limited serviceability.

Among the objectives of the present invention are to provide a novel method and apparatus for making charges of glass which have an inner body of one type of glass and an external layer of another type of glass wherein the various components of the apparatus can be readily moved to compensate for heat expansion; wherein the various components can be readily serviced; and which will permit adjustment with respect to the components. More specifically, the objectives are to provide a system that allows for forehearth growth and warp of the forehearth which delivers the inner body of glass, without damaging movement between the forehearth and the tube system that delivers glass from the second forehearth; which tube support system can be moved horizontally, vertically and in azimuth to align it with the other components; and which allows the bottom pan system to be moved horizontally and vertically with respect to the glass delivery from the tube system; and wherein the glass delivery system which permits the components to be readily moved for maintenance, ceramic replacement and repair.

In accordance with the invention, a glass delivery system includes a first forehearth having an orifice, a second forehearth having an orifice, a bottom pan assembly adapted to be positioned underneath the orifice of the first forehearth, and a glass delivery tube having an upper end adapted to be positioned underneath the orifice of the second forehearth and a lower end adapted to deliver glass to the bottom pan assembly. The bottom pan assembly has an orifice adapted to deliver cased glass through said orifice to provide an interior glass from said first forehearth and an external layer of glass comprising glass from said second forehearth. Provision is made for moving the glass delivery tube horizontally, vertically and in azimuth relative to the second forehearth and for moving the bottom assembly relative to the first forehearth.

The glass delivery system includes a first carriage system that supports the delivery tube assembly for movement horizontal, vertical and azimuth directions. The glass delivery system further includes a second carriage system on which the bottom pan assembly is mounted with respect to the first forehearth for supporting the bottom pan assembly for horizontal movement relative to the first forehearth. The first carriage system comprises a lower frame assembly which is movable horizontally; an intermediate frame assembly which is movable vertically relative to the lower frame assembly; and an upper frame assembly that supports the tube delivery system on the intermediate frame assembly is movable laterally and in azimuth relative to the intermediate frame assembly.

DESCRIPTION OF THE DRAWINGS

FIG. 1 is a fragmentary partly schematic elevational view of a portion of the apparatus embodying the invention.

FIG. 1A is an elevational view of the apparatus parts being broken away.

FIG. 2 is a fragmentary elevational view of a portion of the apparatus.

FIG. 2A is an enlarged view of the encircled portion 2A in FIG. 2.

FIG. 2B is a sectional view taken along the line 2B—2B in FIG. 2A.

FIG. 2C is a fragmentary sectional view taken along the line 2C—2C in FIG. 2.

FIG. 3 is a fragmentary plan view of a portion of the apparatus taken along the line 3—3 in FIG. 2.

FIG. 4A is an enlarged fragmentary view of a portion of the apparatus shown in FIG. 4

FIG. 16 is a side elevational view of a portion of the apparatus shown in FIG. 1, parts being broken away.

FIG. 17 is an end view taken from the right in FIG. 16.

FIG. 23 is a sectional view taken along the line 23—23 in FIG. 24.

FIG. 24 is a fragmentary view of the encircled portion in FIG. 1A.

FIG. 25 is a sectional view taken along the line 25—25 in FIG. 10.

FIG. 26 is a part sectional view of a portion of the apparatus shown in FIG. 25.

FIG. 27 is an end view of the portion of the apparatus shown in FIG. 26.

DESCRIPTION OF THE PREFERRED EMBODIMENTS

Referring to FIG. 1, glass delivery system embodying the invention is directed to a method of making cased gob glass wherein molten glass from a first forehearth 30 is delivered to a bottom pan assembly 32 where it is combined with molten glass from a second forehearth 34 that delivers glass through a tube assembly 36 to the bottom pan assembly 32. Pan assembly 32 combines the glass from the forehearth 34 to form a stream of molten glass having a solid interior of glass from the forehearth 30 and molten glass from tube assembly 36 to form an outer layer or case on the solid stream which is delivered out of the orifice of the bottom pan assembly 32. Such an apparatus is disclosed in pending U.S. application Ser. No. 08/374,371 filed Jan. 18, 1995 and now abandoned in favor of Ser. No. 08/787,061 filed Jan. 22, 1997, and in pending U.S. application Ser. Nos. 08/374,372 filed Jan. 18, 1995 and now abandoned in favor of Ser. No. 08/782,552 filed Jan. 10, 1997, both incorporated herein by reference.

Figure 22:
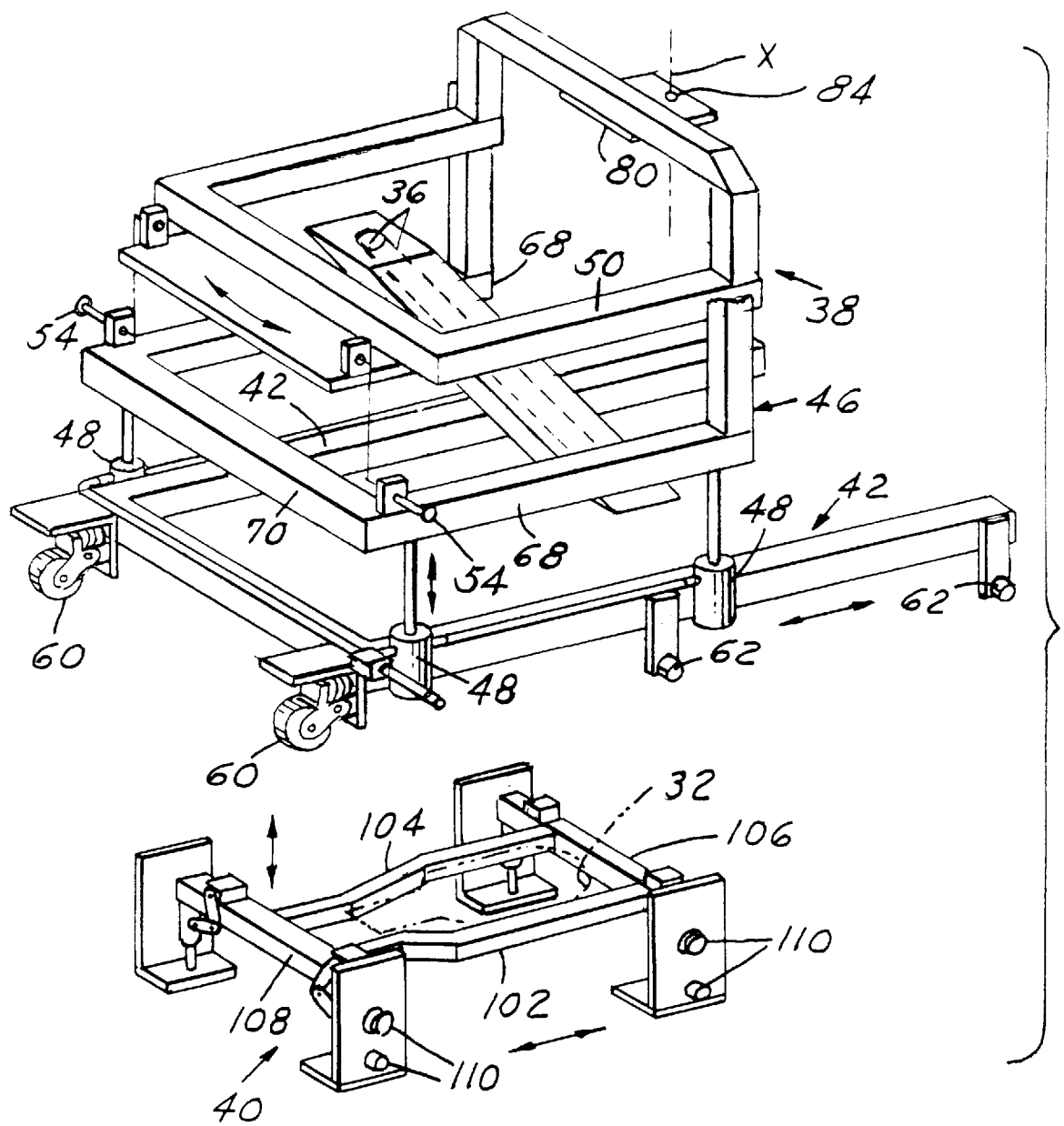
FIG. 22 is an exploded perspective schematic view of portions of the apparatus.

In accordance with the invention as shown in FIGS. 1A and 2, the tube assembly 36 is mounted on a first carriage assembly or system 38 that supports the delivery tube assembly 36 for movement in horizontal, vertical and azimuth directions. The bottom pan assembly 32 is mounted on a second carriage assembly 40 (FIG. 2) that is movable horizontally relative to the forehearth 30. Referring to the schematic in FIG. 22, the first carriage assembly or system 38 includes a lower frame assembly 42 mounted for horizontal movement on fixed horizontal members 44 by chain and drive assembly, as presently described. An intermediate frame assembly 46 is mounted for vertical movement by screw jacks 48 on the lower frame assembly 42. The screw jacks 48 are controlled by a connecting shaft allowing raising and lowering manually from one side. An upper frame assembly 50 which supports the tube assembly 36 is mounted for lateral transverse movement on the intermediate frame assembly 46 by manually operated screw 52 and lock nuts L. Thus, allowing for heat expansion of the tube assembly 36. The upper frame assembly 50 is further mounted for pivotal movement about an axis X which is aligned with the orifice of the bottom pan assembly 32 by screws 54 which are manually operated. This azimuth position is locked in by bolts B.

Figure 15:
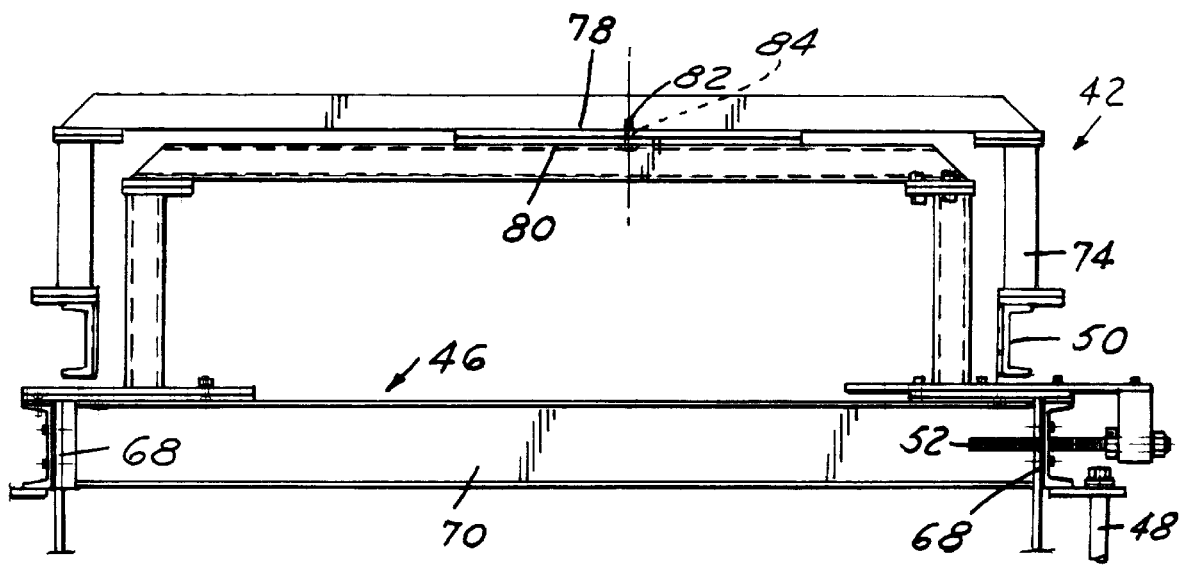
FIG. 15 is a fragmentary end view of a portion of the apparatus shown in FIG. 14.

As shown in FIGS. 15–17, the lower frame assembly 42 comprises spaced longitudinal side members 56 joined by transverse member 58. Large diameter spring loaded rollers 60 are provided at one end of the lower frame assembly 42 and vertically spaced rollers 62, 64 are provided on vertical brackets 66 at the other end. As shown in FIGS. 1A, 2 and 2C, rollers 60 and 62 engage the upper surface of rail 44 that is fixed on the frame structure of the building. Rollers 62, 64 engage the underside of a flange on the rail 44 (FIGS. 4, 4A, 5–7). Rollers 64 are V-rollers to guide the lower frame assembly 42 while rollers 62 are smooth. The lower frame assembly 42 thus has three wheeled support points. The spring loaded wheels 60 limit the end deflection of frame assembly 42.

Figure 4:
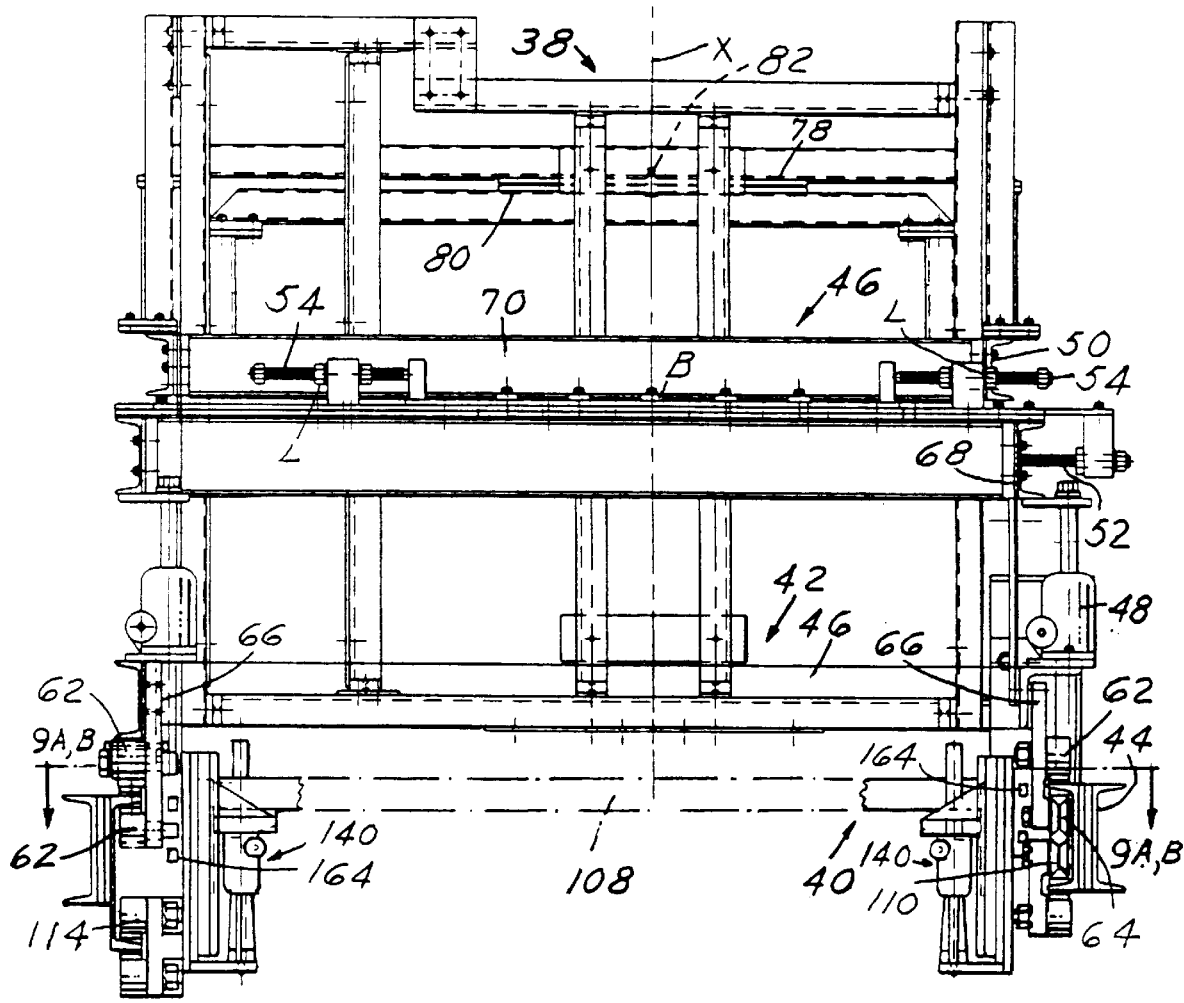
FIG. 4 is an end view taken along the line 4—4 in FIG. 3, parts being broken away.
Figure 8:
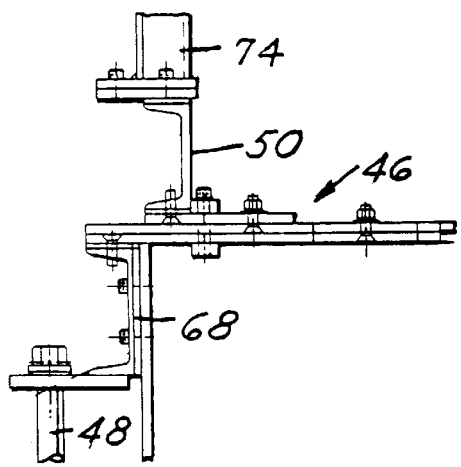
FIG. 8 is a fragmentary sectional view taken along the line 8—8 in FIG. 3.
Figure 9:
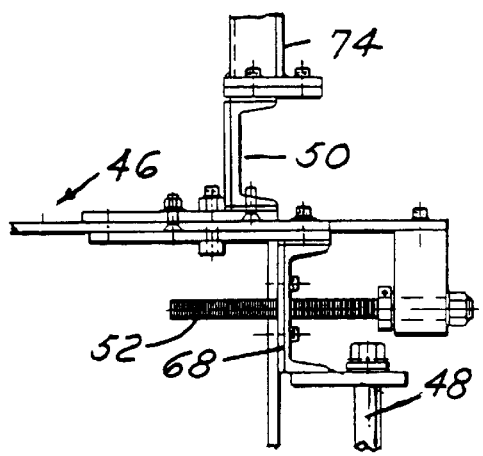
FIG. 9 is a fragmentary sectional view taken along the line 9—9 in FIG. 3.
Figure 5:
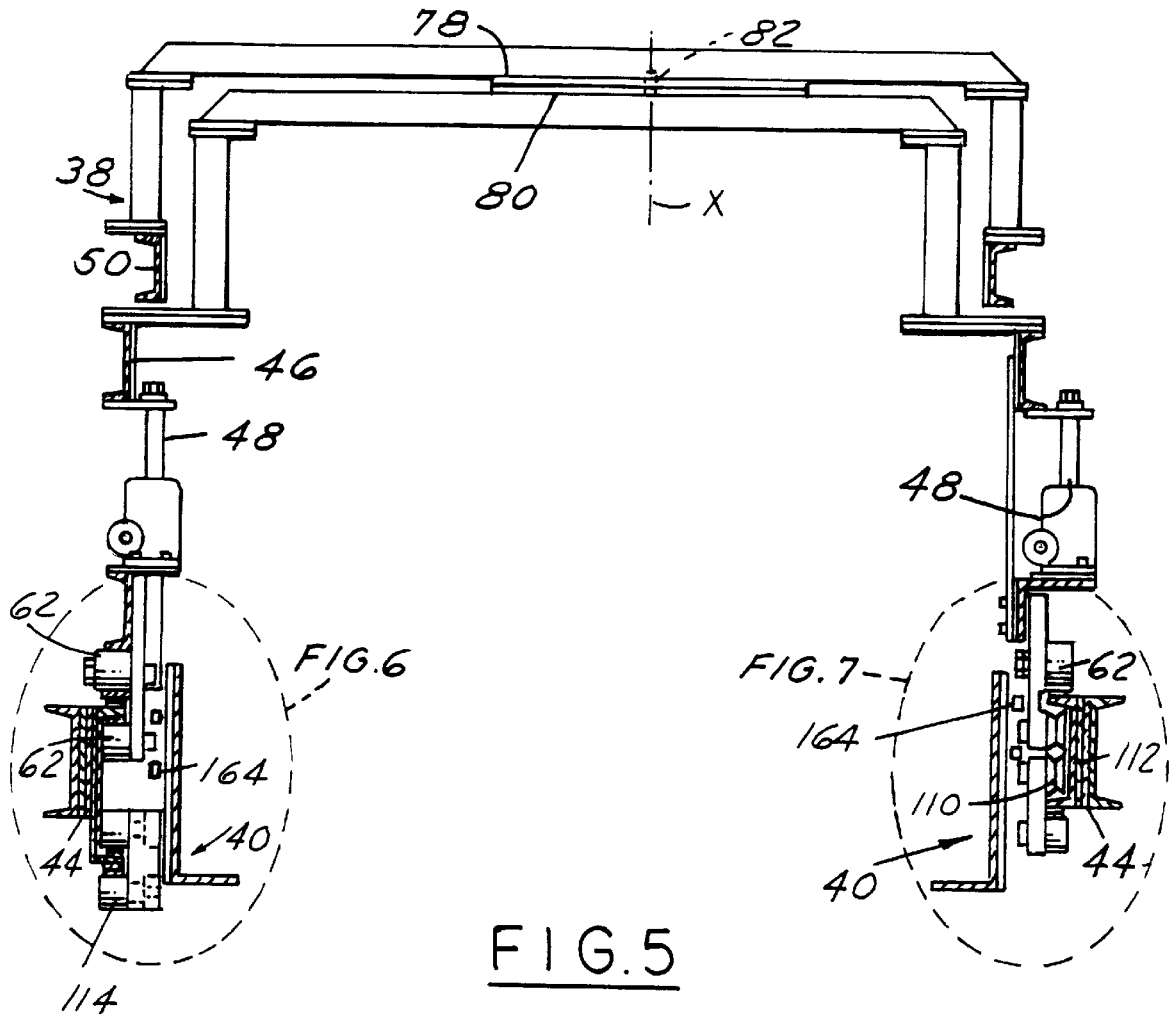
FIG. 5 is a sectional view taken along the line 5—5 in FIG. 3, parts being broken away.
Figures 6, 7:
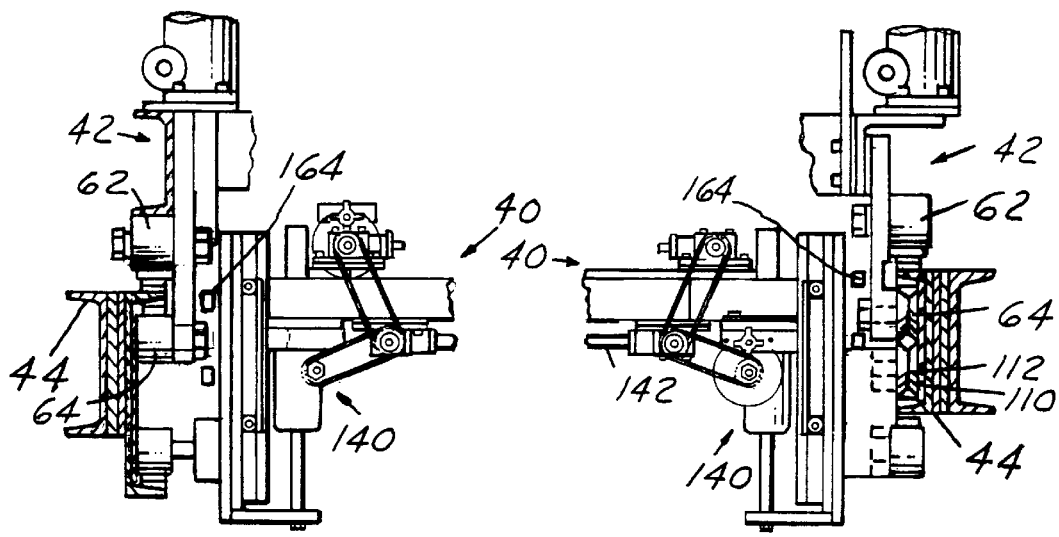
FIG. 6 is an enlarged view of the encircled portion 6 in FIG. 5.
FIG. 7 is an enlarged view of the encircled portion in FIG. 2.
Figure 12:
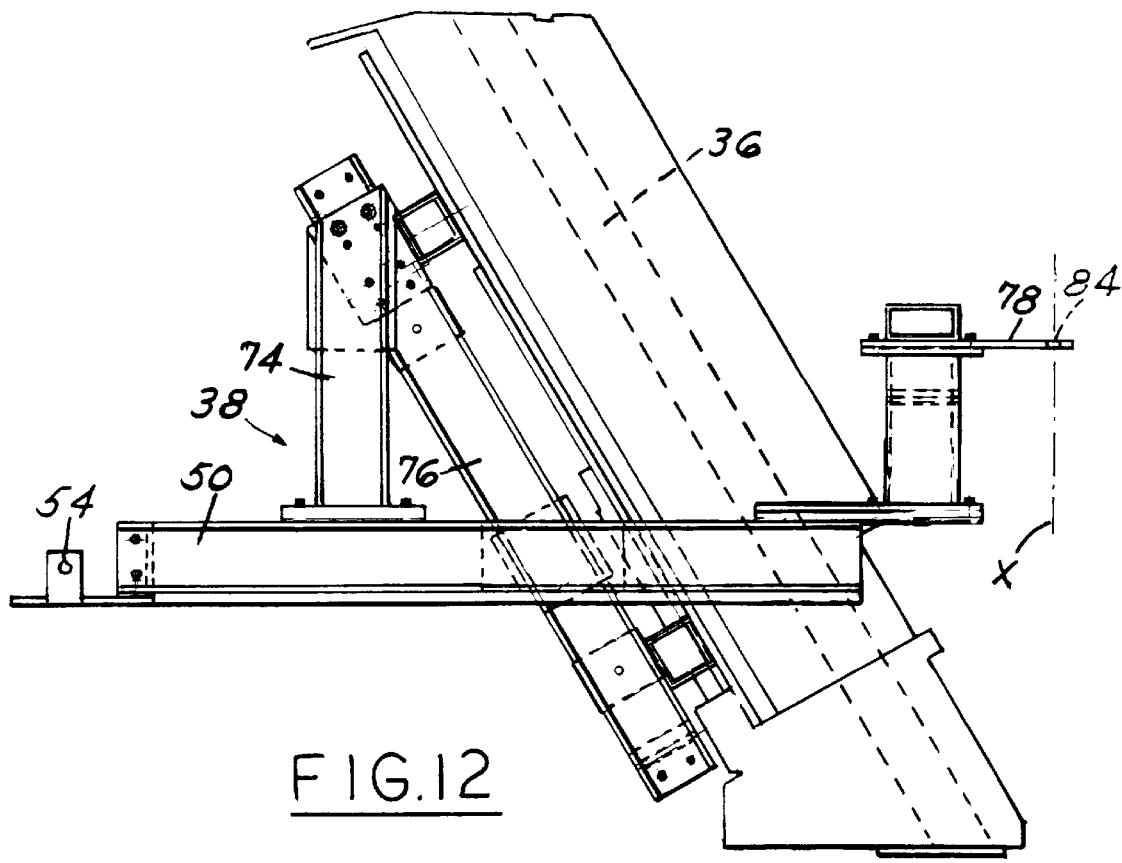
FIG. 12 is a fragmentary view of a portion of the apparatus shown in FIG. 1.
Figure 13:
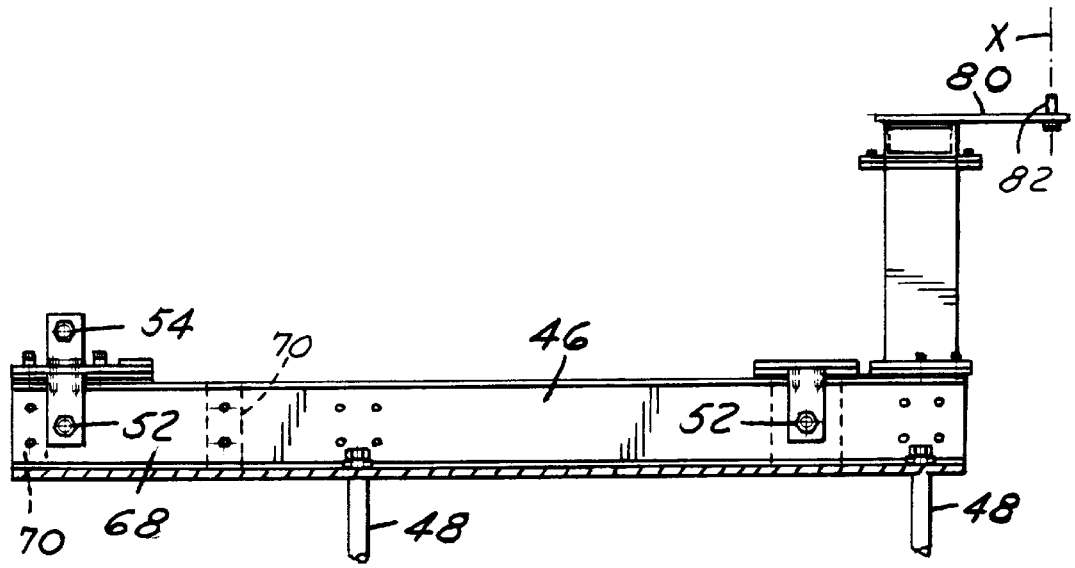
FIG. 13 is a fragmentary elevational view of a portion of the apparatus shown in FIG. 2.
Figure 14:
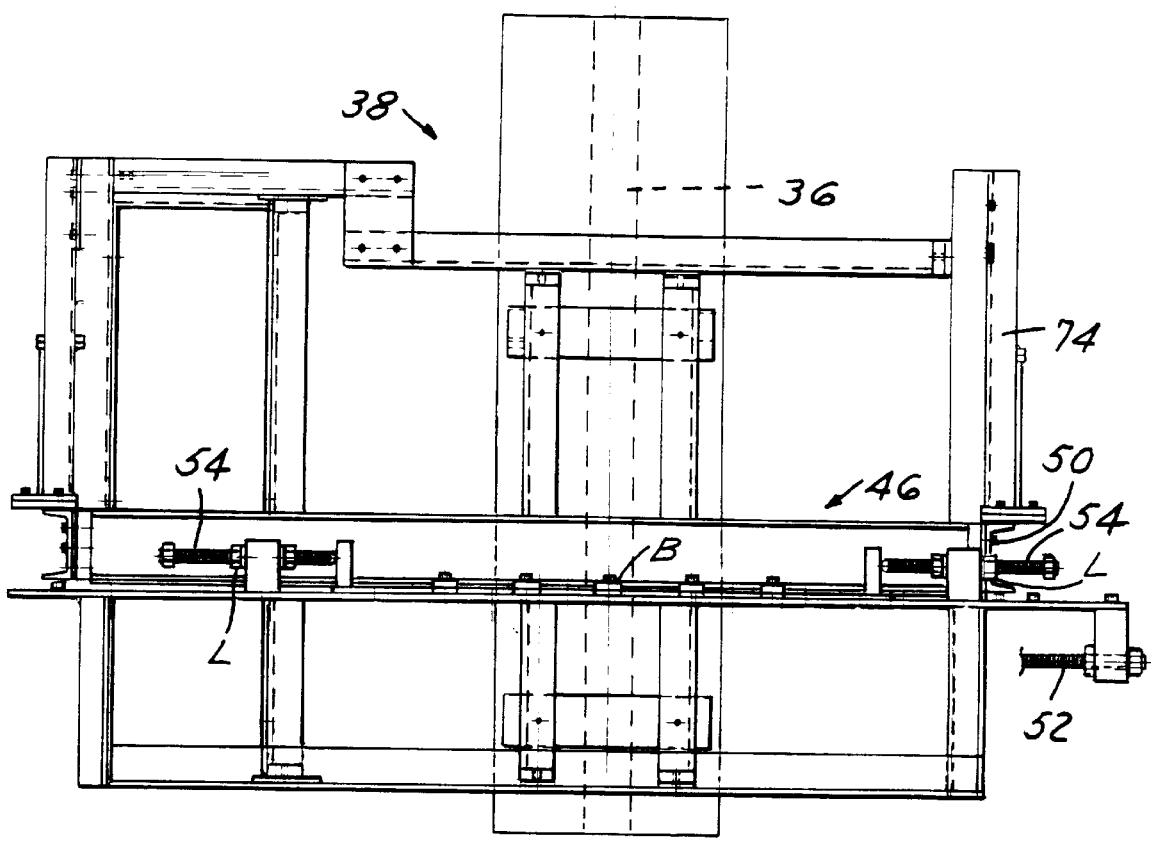
FIG. 14 is a fragmentary view of another portion of the apparatus shown in FIG. 2.
Figure 21:
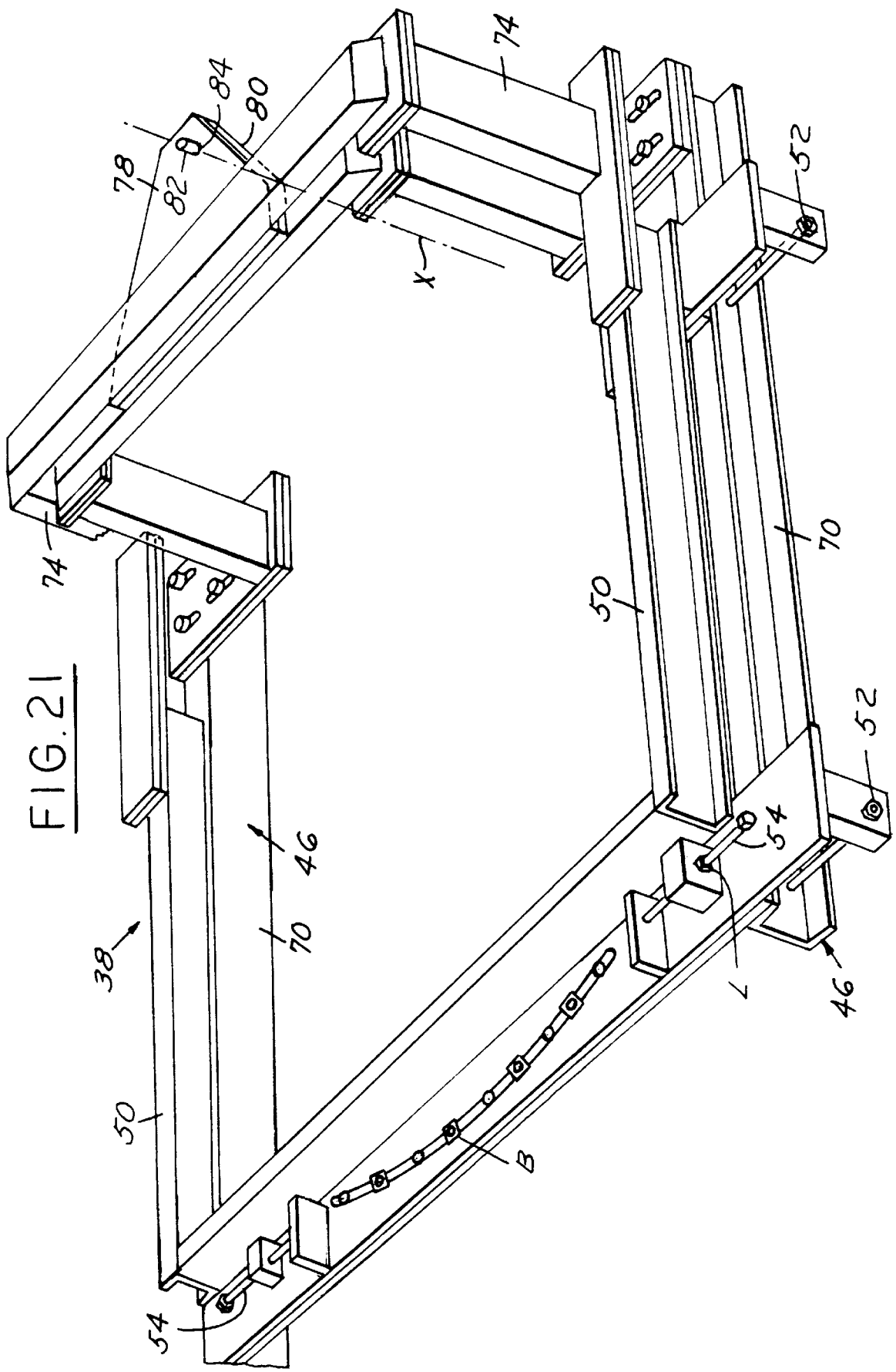
FIG. 21 is a perspective view of a portion of the apparatus shown in FIG. 14.

Referring to FIGS. 13–15, intermediate frame assembly 46 includes longitudinally extending bars 68 joined by one or more transverse bars 70. The upper frame assembly 50 includes a vertical support 74 which together with inclined rectangular frame 76 supports the tube assembly 36 (FIG. 12). When the intermediate frame assembly 46 and upper frame assembly 50 are brought together lateral horizontal flanges 78, 80 come into engagement as shown in FIGS. 1A and 2 forming a pivot point on axis X (FIGS. 4, 12, 13). Flange 80 has a vertical pin 82 that extends upwardly for engaging an opening 84 in flange 78 (FIGS. 15, 21).

Figure 10:
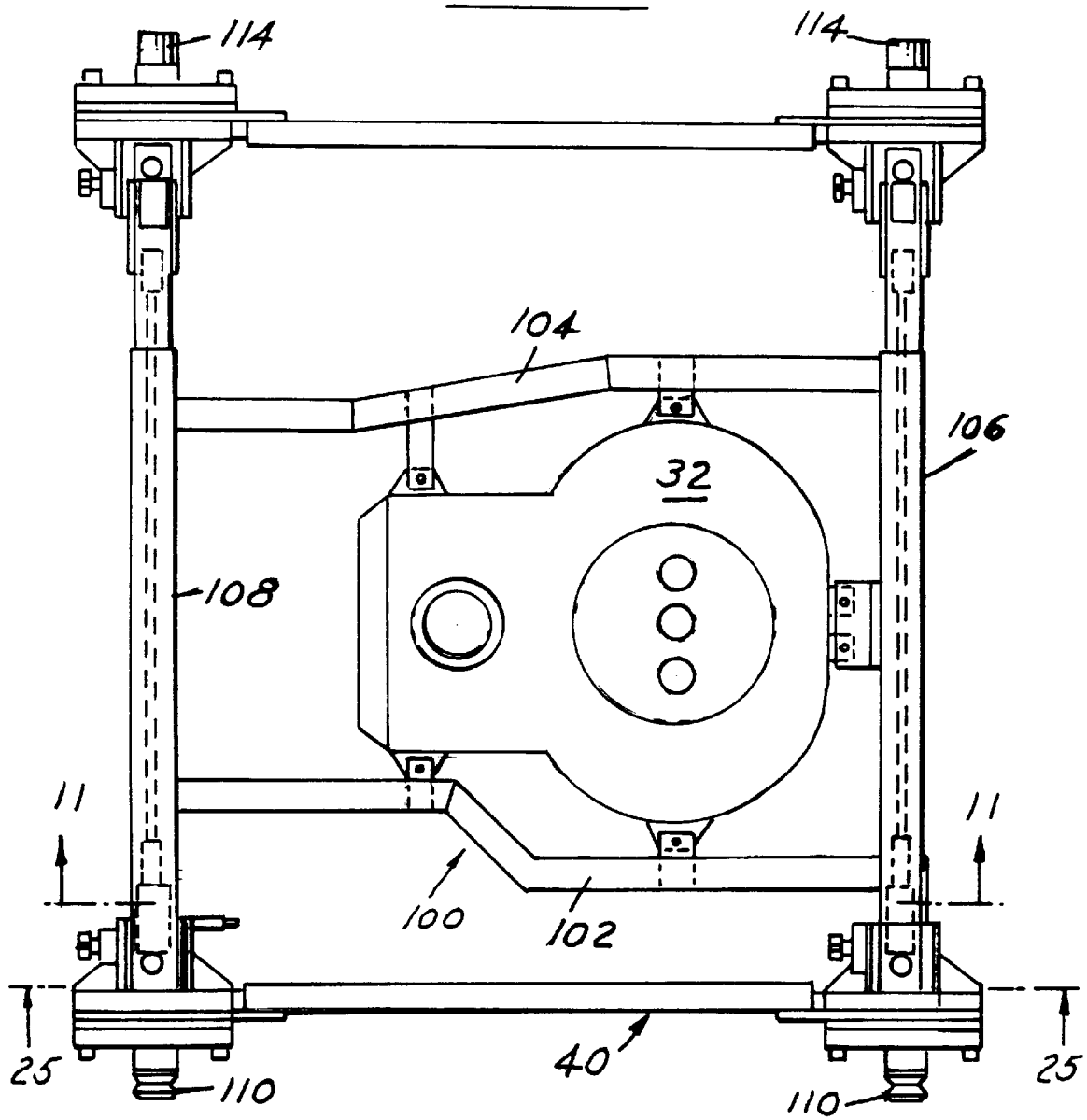
FIG. 10 is a plan view similar to FIG. 3, parts being broken away.
Figure 11:
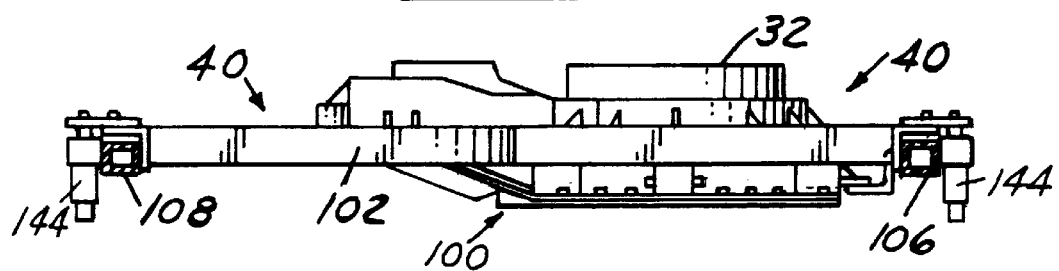
FIG. 11 is a sectional view taken along the line 11—11 in FIG. 10.

Referring to FIGS. 2, 3 4A, 6, 7, 10 and 11, the second carriage system 40 for the bottom pan assembly 32 consists of a frame assembly 100 that in turn includes longitudinally extending members 102, 104 and transverse members 106, 108 (FIG. 10). The carriage assembly 40 includes V-shaped rollers 110 that engage longitudinally extending rails 112 on one of the fixed rails 44 to guide the carriage assembly 40. Rollers 114 engage the other fixed rail 44.

Carriage assembly 40 is brought into position under the spout of the forehearth 30 and is lifted into position by motorized synchronized jacks 140 interconnected by a common shaft 142. Because of the high gear reduction in the jacks 140, the ceramic orifice of the bottom pan assembly 32 could easily be crushed from excessive lifting force. Accordingly, spring assemblies 144 on the four corners of the orifice support frame 100 are used to indicate seating of the orifice. As shown in FIGS. 25–27, each assembly 144 includes a body 146 having a plunger 148 yieldingly urged by a spring 150 into an opening in a plate 152. When the orifice comes into contact with the spout, spring compression movement is observed with a dial indicator. Lifting of the orifice is stopped once the springs are seen to deflect at all four corners. After the lifting is done, jack screws 140 at each spring unit are adjusted to take up the uncompressed slack and prevent any further movement. This is important as the weight of molten glass or someone standing on the carriage will push down the springs, break the orifice seal, and start a glass leak.

In order to place the system in operation, the bottom pan carriage assembly 40 is first brought into position and alignment with the forehearth 30. The tube carriage assembly 38 is then moved along the rails to move the tube 36 into alignment with the forehearth 34 and the bottom pan assembly by energization of a motor M which drives gears 160 interconnected by a common shaft 162 to drive the chains 164 connected to the lower frame assembly 42 (FIGS. 1A, 23, 24).

Figure 18:
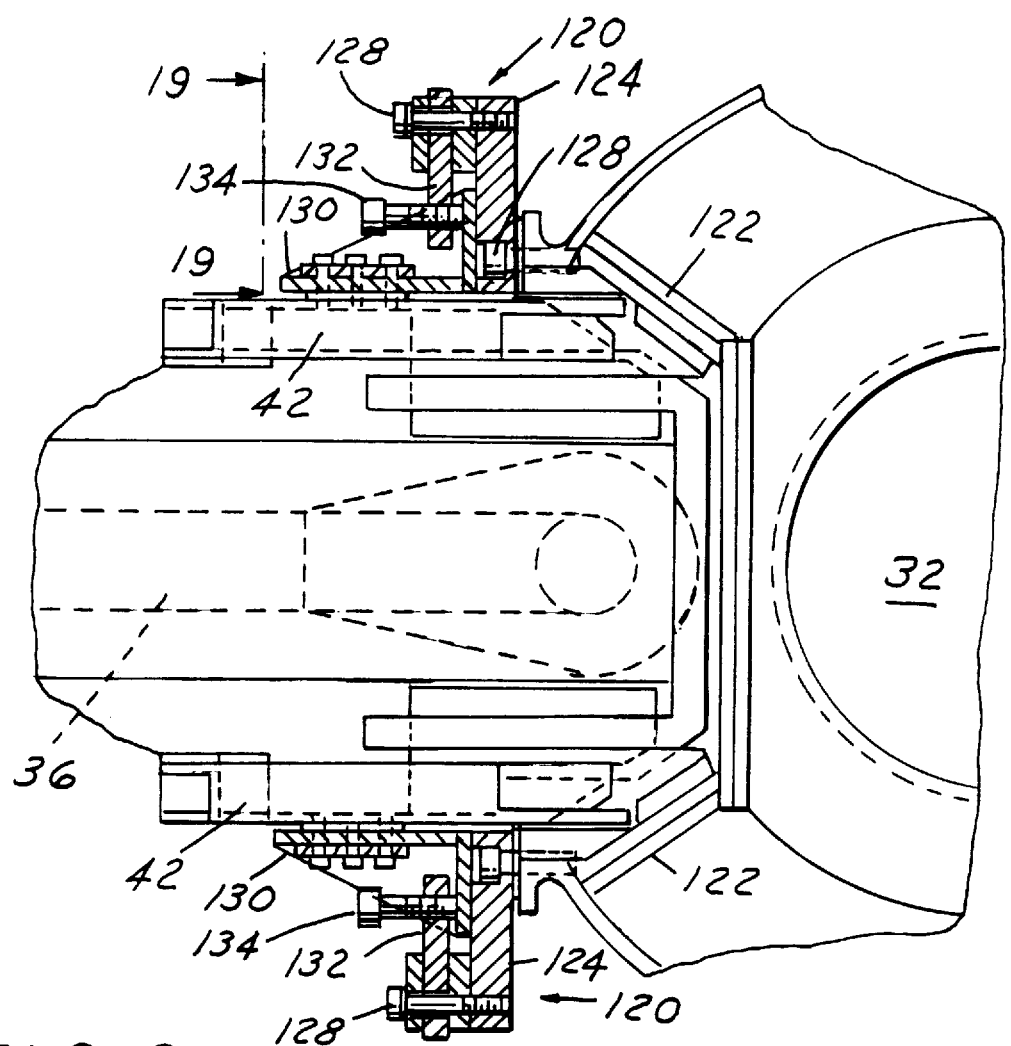
FIG. 18 is a part sectional plan view of a locking mechanism for locking a portion of the apparatus in position.
Figure 19:
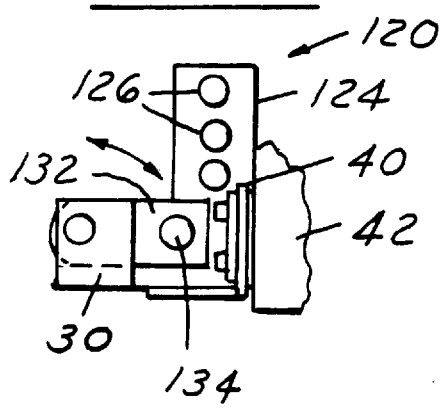
FIG. 19 is a fragmentary view taken along the line 19—19 in FIG. 18.
Figure 20:
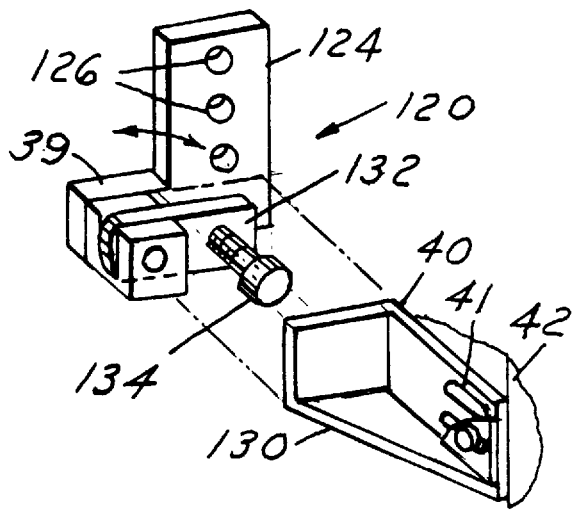
FIG. 20 is a fragmentary exploded perspective view of the portion of the locking mechanism shown in FIG. 19.

In moving the tube assembly 36 into position, the tube 36 may be at a slight angle to the pan assembly and particularly the pan beneath forehearth 30. To insure proper alignment, latch assemblies 120 are mounted on the pan housing 122 (FIGS. 18–20). Each latch assembly 120 includes a base plate bracket 124 having openings 126 through which bolts 128 extend to mount the plate 124 on the pan housing 122. A tube carrier pressure plate 130 is mounted on the lower tube carriage assembly 42 and a swing latch 132 is pivoted to plate 30. When the tube is nested in the pan housing 122, the swing latch 132 is pivoted into position and a bolt 134 threaded in latch 132 is rotated.

If there is a need for leveling the rails 44, provision is made for changing the angle of rails 44 with respect to a fixed portion of a building beam S (FIG. 2) by adjustment assemblies 170 as shown in FIGS. 2A and 2B. Each assembly 170 includes a vertical track 172 that receives a rail 44 and a vertical set screw 174 that can be threaded upwardly or downwardly moving a slide 176 for moving the rail 44. After setting, set screw 174 is locked in position by a lock nut 178.

It can thus be seen that there has been provided a method and apparatus for making charges of glass which have an inner body of one type of glass and an external layer of another type of glass wherein the various components of the apparatus can be readily moved to compensate for heat expansion; wherein the various components can be readily serviced; and which will permit adjustment with respect to the components. More specifically, the objectives are to provide a system that allows for forehearth growth and warp of the forehearth which delivers the inner body of glass, without damaging movement between the forehearth and the tube system that delivers glass from the second forehearth; which tube support system can be moved horizontally, vertically and in azimuth to align it with the other components; and which allows the bottom pan system to be moved horizontally and vertically with respect to the glass delivery from the tube system; and wherein the glass delivery system which permits the components to be readily moved for maintenance, ceramic replacement and repair.

We claim:

1. A method of delivering a cased glass stream comprising the steps of:

providing a first forehearth having an orifice, providing a second forehearth having an orifice, positioning a bottom pan assembly underneath the orifice of said first forehearth, positioning a glass delivery tube means having an upper end underneath the orifice of said second forehearth and lower end to deliver glass to said bottom pan assembly, providing said bottom pan assembly with an orifice to deliver cased glass having a glass interior comprising glass from said first forehearth and an external layer of glass comprising glass from said second forehearth, supporting said glass delivery tube means for movement horizontally, vertically and in azimuth relative to said second forehearth and said bottom pan assembly, supporting said bottom pan assembly for movement horizontal and vertically relative to the first forehearth and the glass delivery tube means, and delivering glass from said first forehearth through said bottom pan assembly, and from said second forehearth through said glass delivery tube through said bottom pan assembly, to deliver a cased glass stream from said orifice of said bottom pan assembly.

2. The method set forth in claim 1 wherein said step of supporting said glass delivery tube means comprises providing a first set of rails, and supporting said glass delivery tube means for a movement on said first set of rails.

3. The method set forth in claim 1 wherein said step of supporting said bottom pan assembly comprises providing a frame assembly on which said bottom pan assembly is mounted and supporting said frame assembly for horizontal movement.

4. The method set forth in claim 1 wherein said supporting said glass delivery tube means and said supporting said bottom pan assembly comprises providing rails and supporting said glass delivery tube means and said bottom pan assembly on said rails.

5. The method set forth in claim 4 including the step of providing said rails with leveling means.

6. The method set forth in claim 1 including a step of interlocking said glass delivery tube means with said bottom pan assembly.

7. The method set forth in claim 1 wherein said supporting said bottom pan assembly comprises providing means for resiliently supporting said bottom pan assembly for vertical movement such that, upon vertical movement of said bottom pan assembly, said resiliently supporting means provides visual evidence of contact with said first forehearth such that the bottom pan assembly can be locked in position relative to said first forehearth.

8. The method set forth in claim 1 wherein said step of supporting said glass deliver tube means comprises providing a lower frame assembly, providing an intermediate frame assembly, providing an upper frame assembly, supporting said glass delivery tube means on said upper frame assembly, supporting said lower frame assembly for horizontal movement, supporting said intermediate frame assembly for vertical movement relative to said lower frame assembly, and supporting said upper frame assembly on said intermediate frame assembly for lateral movement and pivotal movement relative to said intermediate frame assembly.

9. The method set forth in claim 8 wherein said step of supporting said intermediate frame assembly relative to said lower frame assembly comprises providing means for moving said intermediate frame assembly vertically with respect to said lower frame assembly.

10. The method set forth in claim 9 wherein said step of providing said means for moving said intermediate frame assembly comprises providing vertical screw jacks.

11. A glass delivery system comprising a first forehearth having an orifice, a second forehearth having an orifice, a bottom pan assembly adapted to be positioned underneath the orifice of said first forehearth, glass delivery tube means having an upper end adapted to be positioned underneath the orifice of said second forehearth and a lower end adapted to deliver glass to said bottom pan assembly, said bottom pan assembly having an orifice for delivering cased glass having an interior comprising glass from said first forehearth and an external layer of glass comprising glass from said second forehearth, first means for supporting said glass delivery tube means for movement horizontally, vertically and in azimuth relative to said second forehearth and said bottom pan assembly, and second means for moving said bottom pan assembly horizontally and vertical relative to the first forehearth and delivery tube means.

12. The glass delivery system set forth in claim 11 wherein said first means comprises a lower frame assembly, an intermediate frame assembly, an upper frame assembly supporting said glass delivery tube means, means for supporting said lower frame assembly for horizontal movement, means interposed between said lower frame assembly and said intermediate frame assembly for supporting said intermediate frame assembly for vertical movement relative to said lower frame assembly, and means for supporting said upper frame assembly for lateral movement and pivotal movement relative to said intermediate frame assembly.

13. The apparatus set forth in claim 12 including a single rail means for supporting said lower frame assembly for horizontal movement and said bottom pan assembly for horizontal movement.

14. The apparatus set forth in claim 13 including means for adjusting the vertical position of said rail means.

15. The apparatus set forth in claim 13 including means for moving said glass delivery tube means longitudinally on said rail means.

16. The apparatus set forth in claim 15 wherein said means for moving said glass delivery tube means comprises synchronized chain means.

17. The apparatus set forth in claim 16 wherein said chain means includes power means for moving said chain means.

18. The apparatus set forth in claim 12 wherein said lower frame assembly comprises a frame including spaced longitudinal side members joined by transverse members.

19. The apparatus set forth in claim 12 wherein said lower frame assembly includes first spring loaded rollers and second rollers for supporting said lower frame assembly.

20. The apparatus set forth in claim 19 wherein said second rollers comprise V-rollers for engaging a V-track of a rail means for supporting said lower frame assembly for horizontal movement.

21. The apparatus set forth in claim 12 wherein said intermediate frame assembly comprises longitudinally extending bars joined by at least one transverse bar.

22. The apparatus set forth in claim 21 wherein said upper frame assembly comprises vertical support means and inclined support means supporting said glass delivery tube means.

23. The apparatus set forth in claim 22 including a lateral flange on said vertical support means of said upper frame assembly, said intermediate frame assembly includes a vertical support having a lateral flange which is engaged by said flange on said vertical support means and interengaging means between said flanges defining a vertical axis about which the upper frame assembly is moved relative to said intermediate frame assembly.

24. The apparatus set forth in claim 12 including means for locking said upper frame assembly and intermediate frame assembly in azimuth position relative to one another.

25. The apparatus set forth in claim 12 including means for locking said upper frame assembly and said intermediate frame assembly in horizontal position relative to one another.

26. The apparatus set forth in claim 11 including means for interlocking said glass delivery tube means and said bottom pan assembly.

27. The apparatus set forth in claim 26 wherein said interlocking means comprises latch means.

28. The apparatus set forth in claim 27 wherein said latch means comprise a swing latch pivoted on said glass delivery tube means and means for locking said latch.

29. The apparatus set forth in claim 28 wherein said locking means comprises bolt means threaded through the latch and engaging said bottom pan assembly.

* * * * *